100 # United States Patent [19]

Morris

[11] 3,919,143

[45] Nov. 11, 1975

[54] VULCANIZABLE COMPOSITIONS CONTAINING HALOGEN-BEARING ELASTOMERIC POLYMERS

[75] Inventor: Roger E. Morris, Cuyahoga Falls, Ohio

[73] Assignee: The B. F. Goodrich Company, Akron, Ohio

[22] Filed: Feb. 4, 1974

[21] Appl. No.: 439,258

[52] U.S. Cl. ..... 260/18 R; 260/23 AR; 260/23 XA; 260/63 UY; 260/78.4 D; 260/2 A; 260/80.76; 260/80.78; 260/80.81; 260/83.5; 260/89.5 S; 260/91.7; 260/92.8 A; 260/94.9 GA; 260/94.9 GB
[51] Int. Cl.² .................. C08F 8/46; C08F 20/22; C08F 114/14; C08F 114/16
[58] Field of Search ..... 260/78.4 D, 92.8 A, 89.5 S, 260/78.5 T, 23 AR, 23 XA, 2 A, 18 R

[56] References Cited

UNITED STATES PATENTS

| 3,324,088 | 6/1967 | Waldron | 260/79.3 |
| 3,557,064 | 1/1971 | Edwards et al. | 260/78.4 D |

*Primary Examiner*—Joseph L. Schofer
*Assistant Examiner*—Maria S. Tungol
*Attorney, Agent, or Firm*—J. Hughes Powell, Jr.

[57] ABSTRACT

Compositions comprising (1) a halogen-bearing elastomeric polymer and (2) a cure system consisting essentially of (a) a di- or polyfunctional carboxylic acid, (b) a quaternary ammonium salt, or a monofunctional secondary or tertiary amine, and (c) a halide ion acceptor, are readily cured to yield vulcanizates having good physical properties. In the cure system, items (a), (b), and (c) can be combined in one or more forms.

41 Claims, No Drawings

VULCANIZABLE COMPOSITIONS CONTAINING HALOGEN-BEARING ELASTOMERIC POLYMERS

BACKGROUND OF THE INVENTION

Halogen-bearing elastomeric polymers are well known. Examples of these are the polychloroprene polymers, the epichlorohydrin elastomers, bromobutyl rubbers, and chlorine cure site acrylate rubbers. Many diverse cure systems have been proposed for these polymers. A recent article in Rubber Chemistry and Technology, Vol. 44, No. 2 (1971), traces the developments in curing halogen-bearing acrylate rubbers. Similar published literature exists in the chloroprene and epichlorohydrin polymer areas. Most of the cure systems disclosed in the art are directed to the improvement of one or more properties of the halogen-bearing polymer involved. To this array of knowledge the inventor contributes a new general purpose cure system whereby a halogen-bearing elastomeric polymer can be cured to a useful vulcanizate. The art most relevant to the present invention is as follows: U.S. Pat. Nos. 2,600,414; 3,488,331; 3,489,642; 3,686,156; 3,732,174, and 3,732,190.

SUMMARY OF THE INVENTION

Halogen-bearing elastomeric polymers are vulcanized using a cure system consisting essentially of (a) a di- or polyfunctional carboxylic acid which has 6 or more carbon atoms in the molcule, (b) either a quaternary ammonium salt or a monofunctional secondary or tertiary amine, and (c) a halide ion acceptor. The cure system ingredients can be used separately or in combined forms. The combination of a halogen-bearing elastomeric polymer and the cure system readily cures upon heating to useful vulcanizates. No sulfur, in an elemental form, or present in any of the curatives, is used in the cure.

DETAILED DISCLOSURE

Halogen-bearing elastomeric polymers are vulcanized using as a cure system (a) a di- or polyfunctional carboxylic acid, (b) a quaternary ammonium alt or a monofunctional secondary or tertiary amine, and (c) a halide ion acceptor. The three cure system ingredients can be used separately or in combined forms of each other. For example, the monofunctional secondary or tertiary amine can be used as the amine salt of a polyfunctional carboxylic acid ($a+b$); a di(quaternary ammonium salt) of a dicarboxylic acid can be used ($a+b+c$); or an alkali metal or alkaline earth metal salt of a dicarboxylic acid can be used ($a+c$). No sulfur, present in either an elemental form, as a sulfur donor, or present in any of the curatives, is needed for cure.

Halogen-Bearing Elastomeric Polymer

The novel cure system is a general purpose cure system for halogen-bearing elastomeric polymers. By elastomeric polymer is meant a rubber or elastomer, or possessing properties of a rubber or elastomer. These polymers are of two main types: those obtained by the polymerization of halogen-bearing monomers and those obtained by halogenating pre-existing polymers. Either type of halogen-bearing elastomer has a range of from about 0.1% to about 60% by weight of halogen based on the weight of the polymer. Such a range of halogen content can be exemplified by a copolymer of 99.5% by weight of ethyl acrylate and 0.5% by weight of 5-chloromethyl-2-norbornene (the low range), and a polyepibromohydrin polymer (the high range). More typically, the halogen-bearing elastomeric polymer will have from about 0.2 to about 40% by weight of halogen, exemplified by a copolymer of 99% by weight of ethyl acrylate and 1% by weight of vinyl chloroacetate or 2-chloroethyl acrylate (the low range) and polychloroprene rubber or an epichlorohydrin polymer (the high range). As shown, the halogen content of the polymer can vary over a wide range. The halogen is selected from chlorine, bromine or iodine. More preferredly, the halogen is chlorine or bromine, and typically, due to cost and availability, the halogen-bearing elastomeric polymer has chlorine groups.

As mentioned, the halogen-bearing polymers can be (co) polymers of halogen-bearing monomers or they can be halogenated elastomeric polymers (or even a polymer containing halogen obtained by both methods).

The larger of the two types of halogen-bearing polymers are those obtained by polymerization of halogen-bearing monomers. These polymers can contain from about 0.2% by weight to 100% by weight (i.e., homopolymers) of interpolymerized units of a halogen-bearing monomer and up to 99.8% by weight of a copolymerizable, non-halogen-containing, vinylidene monomer.

Examples of halogen-bearing monomers are halogen-bearing vinylidene hydrocarbons such as vinyl benzyl chloride, vinyl benzyl bromide, 5-chloromethyl-2-norbornene, 5-bromomethyl-2-norbornene, 5-$\beta$-chloroethyl-2-norbornene, and the like; and chloroprene, bromoprene, 2-$\beta$-chloroisopropyl butadiene, and the like; and halogen-bearing vinylidene hydrocarbons containing oxy linkages such as halogen-bearing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 5-chloroacetoxymethyl-2-norborene, 5-($\alpha,\beta$-dichloropropionylmethyl)-2-norbornene, and the like. Examples of the more preferred halogen-bearing vinylidene monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

These halogen-bearing vinylidene monomers are often copolymerized with one or more non-halogen-containing vinyl monomers containing a terminal vinylidene

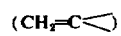

group. These monomers, used in up to 99.8% by weight, are acrylates and methacrylates, such as ethyl acrylate, n-butyl acrylate, octyl acrylate, dodecyl acrylate, methyl methacrylate, phenyl acrylate, cyclohexyl acrylate, and the like; vinyl and allyl esters such as vinyl acetate, vinyl propionate, vinyl butyrate, allyl acetate, and the like; vinyl ketones such as methyl vinyl ketone, propyl vinyl ketone, and the like; vinyl allyl ethers such as vinyl methylether, vinyl ethylether, vinyl isobutylether, allyl methylether, and the like; vinyl aromatics such as styrene, α-methylstyrene, vinyl toluene, vinyl naphthalene, and the like; vinyl nitriles such as acrylonitrile, methacrylonitrile, and the like; dienes such as butadiene, isoprene, 2-isopropyl-1,3-butadiene, and the like; α-monoolefins such as ethylene, propylene, 1-butene, 1-hexene, and the like; divinyls such as divinyl benzene, divinyl ether, diethylene glycol diacrylate, and the like; vinyl amides such as acrylamide, methacrylamide, N-methyl methacrylamide, diacetone acrylamide, and the like; hydroxyl containing vinyl monomers such as allyl alcohol, β-hydroxyethyl acrylate, α-hydroxypropyl acrylate, 4-hydroxybutyl acrylate, β-hydroxyethyl methacrylate; and the like.

One of the most preferred copolymerizable vinylidene monomers to be used with the halogen-bearing monomers is the acrylate monomer. The acrylate has the formula

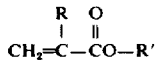

wherein R is H, —CH$_3$ or —C$_2$H$_5$, and R' is an alkyl radical containing 1 to about 24 carbon atoms, or an alkoxyalkyl or alkylthioalkyl radical containing a total of 2 to about 12 carbon atoms total in the radical. The alkyl structure can be linear or branched. Examples of the acrylates are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decylacrylate, n-dodecyl acrylate, n-tetradecyl acrylate, n-octadecyl acrylate, n-eicosyl acrylate, and the like; methyl methacrylate, ethyl methacrylate, n-hexyl methacrylate, n-octyl methacrylate, n-dodecyl methacrylate, n-octadecyl methacrylate, ethyl ethacrylate, n-butyl ethacrylate, and the like; and methoxyethyl acrylate, ethoxyethyl acrylate, butoxyethyl acrylate, ethoxypropyl acrylate, methoxyethyl methacrylate, methylthioethyl acrylate, hexylthioethyl acrylate, and the like. Often mixtures of two or more types of acrylate monomers are employed.

More preferredly, R' is an alkyl radical containing 1 to about 18 carbon atoms or an alkoxyalkyl radical containing 3 to about 8 carbon atoms. Examples of the more preferred monomers are ethyl acrylate, n-propyl acrylate, isopropyl acrylate, n-butyl acrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Especially good results are obtained when employing ethyl acrylate, n-butyl acrylate, 2-ethylhexyl acrylate or methoxyethyl acrylate, or mixtures of the same.

Examples of the halogen-bearing elastomeric polymers obtained from polymerization of halogen-bearing vinylidene monomers are poly(ethyl acrylate/2-chloroethyl vinyl ether), poly(ethyl acrylate/vinyl chloroacetate), poly(ethyl acrylate/butyl acrylate/2-chloroethyl acrylate), poly(butyl acrylate/methoxy ethyl acrylate/5-chloromethyl-2-norbornene), poly(ethyl acrylate/vinyl benzyl chloride), poly(ethyl acrylate/2-ethylhexyl acrylate/5-chloroacetoxymethyl-2-norbornene), poly(ethyl acrylate/chloroprene), polychloroprene, poly(butadiene/chloroprene), and the like.

Another type of halogen-bearing monomer is the epihalohydrin monomer used to prepare epihalohydrin polymers. The polyepihalohydrin polymer can be an epihalohydrin homopolymer, a copolymer of two or more epihalohydrin monomers, or a copolymer of an epihalohydrin monomer(s), with an oxide monomer(s).

The epihalohydrin monomers have the formula

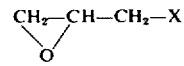

where X is Cl, Br, or I. More preferredly, X is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1,2-epoxy butane, 4-bromo-1,2-epoxy butane, 1-bromoethyl glycidyl ether, and the like.

The oxide comonomers contain a cyclic oxy

ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isopropyl glycidyl ether, n-hexyl glycidyl ether, phenyl glycidyl ether, and the like; glycidyl acrylate and glycidyl methacrylate; allyl glycidyl ether; styrene oxide; and 4- and 5-membered oxy ring compounds such as furan and methyl substituted furan, and the like. Of the oxide comonomers, the alkylene oxides containing 2 to about 8 carbon atoms are preferred. Copolymers of epihalohydrin monomer(s) and alkylene oxide monomer(s) are readily available. Copolymers of epihalohydrin monomers and oxide monomers typically comprise about 50 to 100% by weight (i.e., homopolymers) of polymerized units of epihalohydrin monomer(s), and up to 50% by weight of polymerized units of an oxide monomer(s).

Examples of more preferred polyepihalohydrin polymers are polyepichlorohydrin, polyepibromohydrin, poly(epichlorohydrin/epibromohydrin), poly(epichlorohydrin/ethylene oxide), poly(epibromohydrin/ethylene oxide), poly(epichlorohydrin/propylene oxide), poly(epichlorohydrin/ethylene oxide/allyl glycidyl ether), and poly(epichlorohydrin/ethylene oxide/propylene oxide).

A second broad type of halogen-bearing elastomeric polymers are those polymers which have been halogenated via a chemical reaction. Although almost any polymer can be halogenated using techniques known to the art, the polymers most often halogenated are polymers such as poly α-olefins like polyethylene, polypropylene, polybutylene, and copolymers thereof. Examples of halogenated elastomeric polymers are chlorinated poly(isobutylene/isoprene) rubber (i.e., butyl rubber), brominated butyl rubber, brominated poly(ethylene/propylene/diene) rubber (i.e., EPDM rubber), and chlorosulfonated polyethylene polymers (Hypalon rubbers).

Cure System

The halogen-bearing elastomeric polymers are used at 100 parts by weight, and are vulcanized using a cure system consisting essentially of (a) from about 0.1 part to about 10 parts by weight of a di- or polyfunctional carboxylic acid having 6 to about 40 carbon atoms in the molecule, (b) from about 0.1 part to about 10 parts by weight of (i) a quaternary ammonium salt, or (ii) a monofunctional secondary or tertiary amine, and (c) from about 0.1 part to about 15 parts by weight of a halide ion acceptor. Use of over 15 parts by weight of halide ion acceptor is not necessary to achieve good cures. More preferredly, the di- or polycarboxylic acid is used at from about 0.5 part to about 5 parts by weight, the quaternary ammonium salt or amine at from 0.1 part to about 5 parts by weight, and the halide ion acceptor at from about 0.3 part to about 10 parts by weight, per 100 parts by weight of polymer.

Di- or Polycarboxylic Acid

The di- or polyfunctional carboxylic acids have at least 6 carbon atoms and up to 40 or more carbon atoms in the molecule. The carboxylic acids are preferredly aliphatic or alicyclic di- or polycarboxylic acids. More preferredly, the acids are dicarboxylic acids, and most preferredly, they are aliphatic dicarboxylic acids. The acids can be saturated or unsaturated. The acids contain no sulfur atoms.

Examples of the aliphatic di- or polycarboxylic acids are adipic acid, suberic acid, azelaic acid, sebacic acid, 1,12-dodecanedicarboxylic acid, 1,14-tetradecanedicarboxylic acid, and the like; $\beta$, $\beta$-dimethyl succinic acid, $\beta,\beta$-dimethyl glutaric acid, $\beta$-ethyl glutaric acid, $\alpha$-ethyl adipic acid, trimethyl adipic acid, $\beta$-methyl-$\beta$-propyl glutaric acid, n-hexylsuccinic acid, n-octyl succinic acid, n-decyl succinic acid, n-decenyl succinic acid, n-tetradecyl succinic acid, n-octadecyl succinic acid, iso-octadecenyl succinic acid, n-eicosyl succinic acid, n-docosenyl succinic acid, and the like; 3-heptanone-1,5-dicarboxylic acid, and the like; and citric acid, and the like. Included as aliphatic acids are aliphatic acid substituted aromatics. Examples of these are o-, m-, and p-phenylene diacetic acid, o-, m-, and p-phenylenedioxyacetic acid, and the like.

Examples of alicyclic dicarboxylic acids are 1,3-cyclopentanedicarboxylic acid, 1,2- or 1,3- or 1,4- cyclohexanedicarboxylic acid, cis- and trans-cyclohexanediacetic acid, norbornene- and norbornane-2,3-dicarboxylic acid, and the like.

Quaternary Ammonium Salt

The quaternary ammonium salts are ammonium salts in which all four hydrogen atoms have been replaced with organic radicals. The quaternary ammonium salts include the structure

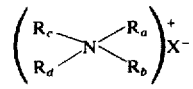

wherein $R_a$, $R_b$, $R_c$ and $R_d$ are hydrocarbon radicals containing 1 to about 18 carbon atoms such as alkyl, aryl, alkaryl and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S, where at least two atoms are C; and X is an anion from an inorganic or organic acid wherein the acidic hydrogen is attached to halogen or oxygen. More preferredly, X is an anion such as $Cl^-$, $Br^-$, $I^-$, $OH^-$, $NO_3^-$, $HSO_4^-$, $NaSO_4^-$, $H_2PO_4^-$, $NaHPO_4^-$, $RCOO^-$, $ROSO_3^-$, $RSO^{3-}$, $H_2BO_3^-$, and $ROPO_3H^-$, and R is an aliphatic, alkyl or alkaryl radical containing 1 to 18 carbon atoms. The aliphatic radical can contain ether, thioether, and/or ester structures. For example, it can be the reaction product of an organic acid or alcohol with ethylene oxide, such as alkylphenoxy poly(ethyleneoxy) ethyl structures.

Examples of the quaternary ammonium salts are tetramethyl ammonium chloride, tetramethyl ammonium bromide, trimethyl ethyl ammonium iodide, trimethyl soya ammonium chloride, trimethyl cetyl ammonium bromide, trimethyl soya ammonium neodecanoate, trimethyl soya ammonium trimethylhexanoate, trimethyl benzyl ammonium benzoate, trimethyl benzyl ammonium chloride, trimethyl benzyl ammonium paratoluene sulfonate, trimethyl soya ammonium alkylbenzene sulfonate, dimethyl ethyl cetyl ammonium chloride, dimethyl octyl benzyl ammonium chloride, dimethyl oleyl benzyl ammonium chloride, dimethyl octadecyl benzyl ammonium chloride, dimethyl phenyl benzyl ammonium bromide, dimethyl dibenzyl ammonium bromide, methyl ethyl propyl isobutyl ammonium chloride, (tetradecyl)trimethyl ammonium chloride, methyl cetyl dibenzyl ammonium bromide, cetyl pyridinium chloride, dodecyl pyridinium bromide, lauryl pyridinium sulfate, trimethyl benzyl ammonium borate, trimethyl benzyl ammonium hydrogen phosphate, trimethyl soya ammonium alkylphenoxy poly(ethylenoxy) ethyl phosphate, and the like.

Secondary and Tertiary Amines

The monofunctional secondary and tertiary amines can be used in their natural form or as amine precursors, as amine/acid salts, or as amine/isocyanate reaction products. Of course, the tertiary amines can be added only in their natural state, as tertiary amine precursors, or as amine/acid salt.

The amine precursors, amine/acid salts and amine/isocyanate reaction products are added at levels which yield the desired level of amine catalyst. For example, if the amine forms forty percent by weight of the compound, and 1 part by weight of the amine is desired, 2.5 parts by weight of the compound would be added to the halogen-bearing elastomeric polymer.

The monofunctional tertiary amines can be aliphatic amines, cyclic methyleneamines, or heterocyclic amines. Examples of such amines are trimethyl amine, triethyl amine, dimethylbutyl amine, dimethylbenzyl amine, methyl dibenzyl amine, dimethyl ethanol amine, methyl diethanol amine, N-methyl piperidine, N-methyl morpholine, quinuclidine, pyridine, 3-ethyl-4-methyl pyridine, 3-phenylpropyl pyridine, and the like. The more preferred tertiary amines are the cylic methyleneamines and heterocyclic amines containing 4 to 8 atoms in the ring, and the tertiary aliphatic amines containing 1 to about 18 carbon atoms in the aliphatic groups, provided that at least one aliphatic group is a methyl or ethyl radical.

The tertiary amines can be employed as amine/acid adducts. In this form, increased scorch safety can be obtained. The acids can be inorganic or organic acids. Examples of the acids are hydrochloric acid, phosphoric acid, lauryl sulfonic acid, benzene sulfonic acid, paratoluene sulfonic acid, alkylbenzene sulfonic acids, aromatic carboxylic acids such as benzoic acid, and aliphatic carboxylic acids, such as acetic acid, propionic acid, butyric acid, hexanoic acid, 2-ethylhexanoic acid, dodecanoic acid, octadecanoic acid, naphthenic acid, and the like. When used in the amine/acid form, the strong tertiary aliphatic amines such as trimethylamine and triethylamine can be conveniently employed. Examples of tertiary amine/acid adducts are trimethylamine/hydrochloric acid adduct, trimethylamine/phosphoric acid adduct, trimethylamine/sodium hydrogen sulfate adduct, trimethylamine/benzoic acid adduct, triethylamine/butyric acid adduct, triethylamine/dodecanoic acid adduct, triethylamine/benzene sulfonic acid adduct, N-methyl piperidine/lauryl sulfonic acid adduct, N-methyl piperidine/benzoic acid adduct, N-methyl piperidine/2-ethylhexanoic acid adduct, quinuclidine/hydrochloric acid adduct, 3-phenylpropylpyridine benzoic acid adduct, and the like. If an amine/acid adduct is used, an acid absorber should be present in sufficient quantity to neutralize the released aid.

The tertiary amines can also be employed as tertiary amine precursors. Aminimides break down at vulcanization temperatures to release a tertiary amine. Used in the compositions of this invention, the aminimides allow for greater scorch safety and yet a fast cure. Examples of these compounds are bis(trimethylamine) sebacimide, bis(dimethyl-2-hydroxypropylamine) adipimide, dimethyl-2-hydroxypropylamine laurimide, and dimethyl-2-hydroxypropylmaine stearimide.

The monofunctional secondary amines can be aliphatic amines, cyclic methyleneamines, or heterocyclic amines. Examples of such amines are dimethylamine, diethylamine, diisopropyl amine, dioctyl amine, dilauryl amine, dibenzyl amine, methylbenzyl amine, methylethanol amine, diethanol amine, imidazole, pyrrolidine, piperidine, morpholine, and the like.

The secondary amine/acid salts are prepared by the reaction of the amine with a halogen acid, a phosphoric acid, or partial phosphoric acid ester, partial ester of a sulfuric acid, or a carboxylic acid, and partial salts of the acids such as sodium hydrogen sulfate. Examples of such acids are hydrochloric acid, hydrobromic acid, phosphoric acid, octadecyl dihydrogen phosphate, dioctyl hydrogen phosphate, lauryl hydrogen sulfate, and monocarboxylic acids such as aliphatic acids, especially the fatty acids, and aromatic acids. Examples of the monocarboxylic acids are acetic acid, propionic acid, butanoic acid, hexanoic acid, octanoic acid, 2-ethyl hexanoic acid, dodecanoic acid, hexadecanoic acid, octadecanoic acid, hydroxy acetic acid, acetoacetic acid, benzoic acid, salicyclic acid, and the like.

More preferredly, the acids are halogen acids or monocarboxylic fatty acids or aromatic acids. Examples of such monofunctional secondary amine/acid salts are dioctyl amine hydrobromide, dilauryl amine stearate, diethanol amine benzoate, piperidine hydrochloride, dimethyl amine benzoate, piperidine benzoate, and the like.

The monofunctional secondary amines can also be added as amine/isocyanate reaction products. The isocyanates can be mono-, di- or polyisocyanates. Examples of the isocyanates are hexyl isocyanate, lauryl isocyanate, octadecyl isocyanate, phenyl isocyanate, p-chlorophenyl isocyanate, 3,4-dichlorophenyl isocyanate, 2,4- and 2,6-toluene diisocyanate, p-phenylene diisocyanate, bitolyl diisocyanate, diphenylmethane-p,p-diisocyanate, diphenylmethane triisocyanate, and the like. The more preferred isocyanates are the aromatic isocyanates.

Examples of secondary amine/isocyanate combinations are dioctylamine-octadecyl isocyanate, dibenzylamine-hexyl isocyanate, morpholine-phenyl isocyanate, dimethylamine-p-chlorophenyl isocyanate, diethylamine-toluene diisocyanate, dibutyl amine-diphenylmethane diisocyanate, piperidine-toluene diisocyanate, pyrrolidine-diphenylmethane-p-p'-diisocyanate and the like.

Halide Ion Acceptor

The halide ion acceptor can include compounds known in the art as acid acceptors. Such compounds include metal oxy compounds such as alkali and non-alkali metal salts of carboxylic or organophosphoric acids; non-alkali metal oxides, hydroxides, and carbonates; inorganic acid metal salts; and molecular sieves.

The metals in these halide ion acceptors are alkali metals such as sodium, potassium, lithium, and the like, or non-alkali metals which include alkaline earth metals such as barium, calcium and magnesium, and polyvalent metals such as lead, zinc, copper, aluminum and cadmium.

The carboxylic acid is a monocarboxylic acid containing from 2 to about 24 carbon atoms. The acids may be unsaturated, and can contain hydroxy, ether, ester, or ketonic groups. Examples of such acids are acetic acid, propionic acid, isopropionic acid, valeric acid, caproic acid, octanoic acid, 2-ethyl hexanoic acid, decanoic acid, lauric acid, palmitic acid, stearic acid, cyclohexane carboxylic acid, crotonic acid, cinnamic acid, hydroxy acetic acid, acetoacetic acid, butoxy acetic acid, levulinic acid, mono-2-octyl maleate, benzoic acid, toluic acid, salicyclic acid, naphthenic acid, and the like. Preferredly, the metal salt is a salt of a saturated alkyl or of an aromatic monocarboxylic acid containing 6 to about 20 carbon atoms.

Examples of metal salts of carboxylic acids are sodium octanoate, potassium 2-ethyl hexanoate, sodium t-dodecanoate, sodium and potassium tetradodecanoate, sodium and potassium stearate, lithium eicosonate, sodium benzoate, potassium naphthenate, and the like; barium dihexanoate, magnesium dilaurate, barium distearate, and the like; and lead dioctanoate, barium di(2-ethylhexanoate), cadmium di-(decanoate), lead dilaurate, zinc and cadmium distearate, zinc and magnesium dibenzoate, cupric naphthenate, and the like.

The metal salts of organo-phosphoric acids also may be used. These compounds are characterized by the structure

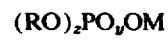

$(RO)_zPO_yOM$ wherein M is an alkali metal, $y = 1$ or 2, $z = 1$ or 2, and $y+z = 3$, and R is an alkyl radical containing 1 to 24 carbon atoms, an aryl radical containing 6 to 24 carbon atoms, or a polyether as the condensation product of an organic acid or alcohol with ethylene oxide, such as alkylphenoxy poly(ethyleneoxy) ethyl groups. Examples of these compounds are sodium salt of monophenyl phosphate, sodium salt of mono-p-tertbutyl phenyl phosphate, potassium salt of di-o-xenyl phosphate, sodium salt of mono-lauryl phosphate, sodium salt of dioctyl phosphate, potassium salt of distearyl phosphate, potassium salt of mono-dodecyl-monO-benzyl phosphate, and sodium and potassium salts of mono- and di-alkylphenoxy poly(ethyleneoxy) ethyl phosphates, and the like. More preferredly, M is sodium or potassium and R, when an alkyl radical, contains about 8 to about 18 carbon atoms, and when an aryl radical contains 6 to about 14 carbon atoms.

The non-alkali metal oxy compounds include oxides, hydroxides and carbonates of multivalent barium (Ba), lead (Pb), calcium (Ca), magnesium (Mg), zinc (Zn), copper (Cu), aluminum (Al), and cadmium (Cd). The more preferred non-alkali metal oxy compounds are the oxides and hydroxides of barium, lead, calcium, and magnesium. Examples of these compounds are barium oxide, barium hydroxide, barium carbonate, lead monoxide, lead dioxide, red lead oxide, lead sesquioxide, lead hydroxide, lead carbonate, calcium oxide, calcium hydroxide, calcium carbonate, magnesium oxide, magnesium hydroxide, magnesium carbonate, cupric oxide, cupric hydroxide, cupric carbonate, cadmium oxide, and cadmium hydroxide.

Inorganic acid metal salts include the non-alkail metal oxy compounds mentioned above, and alkali and alkaline earth metal hydroxides, alkoxides, carbonate, borates, silicates, and phosphates. Examples of the latter are sodium and potassium hydroxide, sodium ethoxide, sodium carbonate, potassium and sodium silicate, calcium silicate, barium silicate, calcium borate, lithium and sodium borate, sodium and potassium phosphate and hydrophosphate, barium phosphate, and the like.

Untreated (i.e., non-loaded) molecular sieves, especially in a light powder form, are useful as the halide ion acceptor.

Combined Forms of Cure System Ingredients

The cure system can be added to the halogen-bearing polymer by admixing a di- or polycarboxylic acid, a quaternary ammonium salt of monofunctional secondary or tertiary amine, and a halide ion acceptor into the polymer. However, three separate ingredients need not be employed. For example, the carboxylic acid and quaternary ammonium salt or amine can be added as one ingredient, i.e., a quaternary ammonium salt or amine salt of a di- or polycarboxylic acid. Further, the carboxylic acid and the halide ion acceptor can be added as an alkali or non-alkali metal salt of a di- or polycarboxylic acid.

Examples of compounds which contain in themselves the ability to perform more than one function of the cure system are as follows: di(sodium)dimethyl glutarate, di(sodium) and di(potassium)trimethyl adipate, di(sodium) and di(potassium)azelate, di(sodium)sebacate, di(potassium)dodecyl succinate, di(diisopropylamine)azelate, di(piperidine)citricontate, di(-dimethylbutylamine)decyl succinate, di(N-methyl piperidine)adipate, di(3-phenylpropyl pyridine)azelate, di(trimethyl soya ammonium) dimethyl glutarate, di(benzyl trimethyl ammonium)sebacate, di(tetradecyl-trimethyl ammonium) azelate, di)dodecyl pyridinium)-1,12-dodecanedicarboxylate, 1-sodium-4-(triethyl cetyl ammonium)-cyclohexane dicarboxylate, di(tetraethyl ammonium)-1,4-cyclohexane dicarboxylate, di(-trimethyl soya ammonium)-1,4-cyclohexane dicarboxylate, and the like. Quaternary ammonium salts of dicarboxylic acids perform all three functions of the cure system.

When a combination compound as described above is used, the amount used is not necessarily the additive total of the ranges of each of the ingredients it substitutes for. For example, if an alkali metal salt of a dicarboxylic acid is used, its level of use is not necessarily the sum of the level of use of the dicarboxylic acid alone and the halide ion acceptor alone. Often the level of use of a combination compound is lower than an additive total, and often the level ranges from about 0.1 part to about 20 parts by weight per 100 parts by weight of halogen-bearing compound. More preferredly, a combination compound is used at from about 0.3 part to about 10 parts by weight.

Of course, when using a compound that performs two functions of the cure system, the ingredient which performs the third function must also be used. Quaternary ammonium salts of di- or polycarboxylic acids have the ability to perform all three functions; i.e., they act as dicarboxylic acids, as quaternary ammonium salts, and as halide ion acceptors. Therefore, only one compound need be used in the cure system.

The cure system can be admixed with the halogen-bearing polymer using Banburys, extruder mixers, two-roll mills and other known mixing machines. Standard mixing procedures and techniques are used.

The polymers can be admixed with many other compounding ingredients. Examples of such ingredients are fillers such as the carbon blacks, calcium sulfates, aluminum silicates, phenolformaldehyde and polystyrene resins, asbestos, cotton fibers, and the like; plasticizers and extenders such as dialkyl and diaryl organic esters like diisobutyl, diisooctyl, and dibenzyl sebacates, azelates, phthalates, and the like; petroleum oils, castor oil, tall oil and the like; antioxidants, and stabilizers such as phenyl-$\beta$-naphthylamine, 2,6-di-t-butyl para-cresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris(3,5-di-t-butyl-4-hydroxybenzyl)isocyanurate, tetrakis-methylene-3(3',-5'-di-t-butyl-4'-hydroxyphenyl)propionate methane, distearyl thiodipropionate, tri(nonylatedphenyl)-phosphite, and the like, and other ingredients such as pigments, tackifiers, flame retardants, fungicides, and the like.

The novel compositions are cured at temperatures from about 250°F. to about 450°F., whereas a more preferred range is from about 275°F. to about 400°F. Cure time varies inversely as temperature, and ranges from about 1 minute to about 60 minutes or more. The polymers can be post-cured for about 3 to 24 hours at a temperature from about 300°F. to about 375°F.

The novel compositions develop rapid and stable cures. The vulcanizates were evaluated as to their plied disk compression set (ASTM D395V), tensile and elongation (ASTM D412), and hardness (ASTM D676-Durometer A). Cure times were determined following ASTM D1646, using a Mooney Viscometer with a large rotor, or using a Monsanto Rheometer or a B.F.G. Cone Curometer, as described in U.S. Pat. No. 3,494,172.

The vulcanizates are useful in many applications where weatherability, high temperature serviceability, and oil resistance are required. Such applications are under-the-hood automotive parts such as gaskets, seals, packings, belting and hosing, and out-of-doors applications such as weatherstripping, sealants, and hosing.

The following examples serve to more fully illustrate the invention.

EXAMPLES

The cure system of this invention is a general purpose cure system for the vulcanization of halogen-bearing elastomeric polymers. The following examples demonstrate the cure of many types of halogen-bearing polymers. Compositions are prepared using standard Banbury and/or two-roll mill mixing techniques.

EXAMPLE I

A halogen-bearing acrylate polymer comprised of interpolymerized units of 50.7% by weight of n-butyl acrylate, 26.7% by weight of methoxyethyl acrylate, 21.3% by weight of ethyl acrylate, and 1.3% by weight of vinyl benzyl chloride was cured. The recipe (in parts by weight) and vulcanizate property data is as follows:

6) as the cure system. Samples 9 and 10 use a bis quaternary ammonium salt of a dicarboxylic acid and a quaternary ammonium alkali metal salt of a dicarboxylic acid respectively as the cure system. All of the above cure systems are within the scope of the present invention. All of the compositions yielded good vulcanizates upon cure. The example demonstrates, particularly, a wide variety of cure ingredients for a halogen-bearing acrylate rubber.

EXAMPLE II

Acrylate rubbers having 5-(α-chloroacetoxymethyl)-2-norbornene as the cure site monomer were used. This example demonstrates the use of a number of different cure ingredients with another type of halogen-bearing elastomeric polymer. The acrylate rubber consists of interpolymerized units of (A) 98.3% by weight of ethyl acrylate and 1.7% by weight of 5-(α-chloroacetoxymethyl)-2-norbornene, or (B) 49.3% by weight of ethyl acrylate, 24.7% by weight of n-butyl acrylate, 24.7% by weight of methoxyethyl acrylate, and 1.3% by weight of

|  | 1 | 2 | 3 | 4 | 5 | 6 | 7 | 8 | 9 | 10 |
|---|---|---|---|---|---|---|---|---|---|---|
| Acrylate Rubber | 100 | 100 | 100 | 100 | 100 | 100 | 100 | 100 | 100 | 100 |
| N550 Black | 60 | 55 | 55 | 60 | 60 | 60 | 55 | 55 | 55 | 55 |
| N881 Black | 20 | 20 | 20 | 20 | 20 | 20 | 20 | 20 | 20 | 20 |
| Acrowax C* | 1 | 2 | 2 | 2 | 2 | 2 | 1 | 2 | 2 | 2 |
| TE-80* | — | — | — | — | — | — | 1 | — | — | — |
| Disodium azelatae | 0.7 | — | — | — | — | — | — | — | — | — |
| Dipotassium azelate | — | 1.2 | 1.2 | — | — | — | — | — | — | — |
| Disodium trimethyl adipate | — | — | — | 0.7 | 0.7 | 0.7 | — | — | — | — |
| Dipotassium dodecenyl succinate | — | — | — | — | — | — | 0.8 | 1.5 | — | — |
| Bis(trimethylamine) sebacimide | 1.0 | 1.0 | — | — | 1.0 | — | 1.6 | 1.0 | — | — |
| Trimethylamine/hydrochloric acid adduct | — | — | — | 0.5 | — | — | — | — | — | — |
| Tetraethyl ammonium p-toluene sulfonate | — | — | — | — | — | 1.5 | — | — | — | — |
| Trimethyl soya ammonium chloride | — | — | 2.0 | — | — | — | — | — | — | — |
| Bis(tetraethyl ammonium)cyclohexane-1,4-carboxylate | — | — | — | — | — | — | — | — | 1.4 | — |
| 1-Sodium-4-(trimethyl cetyl ammonium)-cyclohexane dicarboxylate | — | — | — | — | — | — | — | — | — | 1.6 |
| Sodium stearate | — | — | — | 1.5 | — | — | — | — | — | — |
| Press-Cured |  |  |  |  |  |  |  |  |  |  |
| Time, minutes | 40 | 40 | 40 | 40 | 40 | 40 | — | 40 | 40 | 40 |
| Temperature, °F. | 310 | 310 | 310 | 320 | 320 | 320 | 340 | 310 | 310 | 310 |
| Tensile, psi | 1130 | 1200 | 1150 | 990 | 1050 | 300 | 1030 | 1050 | 1330 | 1150 |
| Elongation, percent | 240 | 250 | 280 | 260 | 200 | 420 | 360 | 320 | 280 | 280 |
| Hardness, Duro. A | 68 | 61 | 57 | 55 | 61 | 56 | 54 | 58 | 55 | 62 |
| Post-Cured, 20 hrs. at 300°F. |  |  |  |  |  |  |  |  |  |  |
| Tensile, psi | 1300 | 1540 | 1550 | 970 | 1000 | 1180 | 1240 | 1130 | 1580 | 1350 |
| Elongation, percent | 125 | 140 | 180 | 200 | 140 | 180 | 220 | 200 | 180 | 180 |
| Hardness, Duro. A | 74 | 67 | 65 | 61 | 71 | 66 | 62 | 67 | 64 | 66 |
| Compression set, after 70 hours at 300°F. |  |  |  |  |  |  |  |  |  |  |
| Press-Cured, percent | 75 | 75 | 78 | 86 | 83 | 92 | 78 | 71 | 74 | 83 |
| Post-Cured, percent | 37 | 40 | 22 | 54 | 50 | 38 | 42 | 47 | 30 | 39 |

*processing aids

Samples 1 to 8 use dialkali metal salts of dicarboxylic acids with either tertiary amines (samples 1, 2, 4, 5, 7 and 8) or quaternary ammonium salts (samples 3 and 6) 5-(α-chloroacetoxymethyl)-2-norbornene. The recipes and data follow.

TABLE A

|  | Control | 1 | 2 | 3 | 4 | 5 | 6 | 7 | 8 |
|---|---|---|---|---|---|---|---|---|---|
| Rubber A | 100 | 100 | 100 | 100 | 100 | 100 | 100 | 100 | 100 |
| N550 Black | 65 | 65 | 65 | 65 | 65 | 65 | 65 | 65 | 65 |
| Acrowax C | 2 | 2 | 2 | 2 | 2 | 2 | 2 | 2 | 2 |
| Disodium azelate | 0.7 | 0.7 | 0.7 | 0.7 | 0.7 | 0.7 | 0.7 | 0.7 | 0.7 |
| Disodium sebacate | — | — | — | — | — | — | — | 0.75 | — |
| Dipotassium dodecenyl succinate | — | — | — | — | — | — | — | — | 1.2 |

TABLE A-continued

|  | Control | 1 | 2 | 3 | 4 | 5 | 6 | 7 | 8 |
|---|---|---|---|---|---|---|---|---|---|
| Trimethyl soya ammonium chloride | 0.2 | 0.8 | 1.0 | 0.6 | 0.5 | — | — | 1.0 | 1.0 |
| Trimethyl soya ammonium p-toluene sulfonate | — | — | — | 0.6 | 1.0 | 1.5 | 2.0 | — | — |
| Sulfur | 0.3 | — | — | — | — | — | — | — | — |
| Press Cured, Time (minutes) | 30 | 20 | 20 | 30 | 30 | 30 | 30 | 30 | 40 |
| Temperature, °F. | 320 | 338 | 338 | 320 | 320 | 320 | 320 | 320 | 338 |
| Tensile, psi | 570 | 1390 | 1470 | 1690 | 1650 | 1550 | 1580 | 1540 | 1730 |
| Elongation, percent | 470 | 330 | 340 | 340 | 350 | 340 | 300 | 400 | 240 |
| Hardness, Duro. A | 73 | 69 | 64 | 65 | 65 | 65 | 63 | 63 | 67 |
| Compression Set (70 hours at 300°F.) |  |  |  |  |  |  |  |  |  |
| Press-Cured, percent | 101 | 63 | 56 | 56 | 51 | 61 | 47 | 62 | 43 |
| Post-Cured, percent | 79 | — | — | 28 | 27 | 32 | 25 | 27 | — |
| (8 hrs. at °F. noted) | 350 | — | — | 350 | 350 | 350 | 350 | 350 | — |

TABLE B

|  | 9 | 10 | 11 | 12 | 13 | 14 | 15 | 16 | 17 | 18 | 19 | 20 |
|---|---|---|---|---|---|---|---|---|---|---|---|---|
| Rubber B | 100 | 100 | 100 | 100 | 100 | 100 | 100 | 100 | 100 | 100 | 100 | 100 |
| N550 Black | 65 | 65 | 65 | 65 | 65 | 65 | 65 | 65 | 65 | 65 | 65 | 65 |
| Acrowax C | 2 | 2 | 2 | 2 | 2 | 2 | 2 | 2 | 2 | 2 | 2 | 2 |
| Dipotassium azelate | 1.0 | — | — | — | — | — | — | — | — | — | — | — |
| Disodium trimethyl adipate | — | 1.0 | — | — | — | 1.5 | 1.8 | 1.0 | 1.0 | 1.0 | 1.0 | 1.0 |
| Dipotassium dodecenyl succinate | — | — | 1.2 | — | — | — | — | — | — | — | — | — |
| Disodium salt of dimer[a] acid | — | — | — | 2.0 | — | — | — | — | — | — | — | — |
| Dipotassium salt of dimer[a] acid | — | — | — | — | 2.0 | — | — | — | — | — | — | — |
| N-methyl piperidine | — | — | — | — | — | 1.0 | 1.0 | — | — | — | — | — |
| Trimethyl soya ammonium chloride | 1.0 | 1.0 | 1.0 | 1.0 | 1.0 | — | — | — | — | — | — | — |
| Dimethyl Dialkyl ammonium chloride | — | — | — | — | — | — | — | 1.5 | — | — | — | — |
| Benzyl trimethyl ammonium dodecylbenzene sulfonate | — | — | — | — | — | — | — | — | 3.0 | — | — | — |
| Benzyl trimethyl ammonium sodium phosphate | — | — | — | — | — | — | — | — | — | 0.8 | — | — |
| Benzyl trimethyl ammonium sodium hydrophosphate | — | — | — | — | — | — | — | — | — | — | 1.5 | — |
| Benzyl trimethyl ammonium hydroborate | — | — | — | — | — | — | — | — | — | — | — | 1.5 |
| Press-Cured, Time (minutes) | 20 | 20 | 20 | 20 | 20 | 30 | 30 | 20 | 20 | 20 | 20 | 20 |
| Temperature, °F. | 350 | 350 | 350 | 350 | 350 | 307 | 307 | 338 | 338 | 338 | 338 | 338 |
| Tensile, psi | 1500 | 1280 | 1300 | 1400 | 1520 | 980 | 1100 | 1090 | 1040 | 1000 | 1050 | 73 |
| Elongation, percent | 210 | 250 | 230 | 230 | 200 | 310 | 300 | 240 | 330 | 150 | 130 | 130 |
| Hardness, Duro. A | 60 | 63 | 57 | 60 | 62 | 60 | 62 | 65 | 60 | 65 | 62 | 61 |
| Compression set (70 hours at 300°F.) |  |  |  |  |  |  |  |  |  |  |  |  |
| Press-cured, percent | 50 | 59 | 59 | 55 | 51 | 80 | 70 | — | — | — | — | — |
| Post-cured, percent | 26 | 27 | 33 | 26 | 26 | 34 | 30 | — | — | — | — | — |
| (8 hrs. at °F. noted) | 350 | 350 | 350 | 350 | 350 | 338 | 338 | — | — | — | — | — |

[a]Dimer of high molecular weight fatty acid

All of the sample compositions (1 to 20) cured readily to yield good vulcanizates. The samples show that the cure system not only does not need sulfur or a sulfur-containing cure agent to effect a cure, but also that the use of sulfur in the system is not desirable (see the control sample).

EXAMPLE III

Acrylate rubbers containing vinyl chloroacetate as the cure site monomer were cured using the cure system of the present invention. The rubbers used are (C) 95% by weight ethyl acrylate and 5% by weight vinyl chloroacetate, and (D) 50% by weight n-butyl acrylate, 48% by weight methoxyethyl acrylate, and 2% by weight vinyl chloroacetate. Recipes and data are in the following table.

|  | 1 | 2 | 3 | Control |
|---|---|---|---|---|
| Rubber C | 100 | 100 | — | — |
| Rubber D | — | — | 100 | 100 |
| N550 Black | 65 | 65 | 55 | 55 |
| N881 Black | — | — | 20 | 20 |
| Acrowax C | 2 | 2 | 1 | 1 |
| TE-80 | — | — | 1 | 1 |
| Disodium azelate | 0.7 | 0.7 | 0.6 | — |
| Trimethyl soya ammonium chloride | 1.0 | — | 1.0 | — |
| Bis(trimethylamine) sebacimide | — | 1.0 | — | — |
| Dibasic lead phosphite | — | 5.0 | — | — |
| Sodium stearate | — | — | — | 3.5 |
| Sulfur | — | — | — | 0.3 |
| Press Cure, 30' at 320°F. |  |  |  |  |
| Tensile, psi | 1430 | 1600 | 1310 | 1310 |
| Elongation, % | 300 | 270 | 225 | 140 |
| Hardness, Duro. A | 61 | 70 | 55 | 64 |

-continued

|  | 1 | 2 | 3 | Control |
|---|---|---|---|---|
| Post Cure, 20 hrs. at 300°F. |  |  |  |  |
| Tensile, psi | 1500 | 1980 | 1330 | 1350 |
| Elongation, % | 180 | 140 | 130 | 135 |
| Hardness, Duro. A | 70 | 76 | 62 | 66 |
| Compression set (70 hrs. at 300°F.) |  |  |  |  |
| Press Cure, percent | 76 | 81 | 67 | 63 |
| Post Cure, percent | 44 | 49 | 32 | 39 |

Samples 1, 2 and 3 are compositions of this invention. The data obtained shows that the vulcanizates have properties comparable to those obtained using the known soap-sulfur cure system (control sample), yet the novel cure system needs no sulfur to effect a cure.

EXAMPPLE IV

The novel cure system was employed to cure polyepihalohydrin elastomers. Two elastomers were used: (E) a polyepichlorohydrin homopolymer having a Mooney value (ML-4 at 212°F.) of about 60, and (F) a poly (68% by weight epichlorohydrin - 32% by weight ethylene oxide) copolymer having a ML-4 at 212°F. Mooney viscosity of about 100. The recipes and data are in the following table.

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Elastomer E | 100 | 100 | 100 | 100 | 100 | 100 | 100 | 100 | 100 | — | — | — | — | — |
| Elastomer F | — | — | — | — | — | — | — | — | — | 100 | 100 | 100 | 100 | 100 |
| N550 Black | 30 | 30 | 30 | 30 | 30 | 30 | 30 | 30 | 30 | 30 | 30 | 30 | 30 | 30 |
| TE-80 | 1 | 1 | 1 | 1 | 1 | 1 | 1 | 1 | 1 | 1 | 1 | 1 | 1 | 1 |
| Nickel dibutyl dithio carbamate | 1 | — | — | — | — | — | — | — | — | 1 | 1 | — | 1 | 1 |
| Disodium trimethyl adipate | 1.1 | — | — | — | — | — | — | — | — | — | — | — | — | — |
| Dipotassiuim azelate | — | — | — | — | — | — | — | — | — | 1.0 | — | — | — | — |
| Dipotassium tri-methyl adipate | — | 1.1 | 1.3 | 1.3 | 1.3 | — | — | — | — | — | 1.0 | 1.1 | — | — |
| Dipotassium dode-cenyl succinate | — | — | — | — | — | — | — | — | — | — | — | — | 1.3 | — |
| Dipotassium salt of Dimer acid | — | — | — | — | — | — | — | — | — | — | — | — | — | 2.0 |
| Trimethyl soya ammonium chloride | 1.2 | 1.2 | 1.5 | — | — | — | — | — | — | 1.2 | — | 1.2 | 1.2 | 1.2 |
| Dodecyl pyridinium bromide | — | — | — | — | — | — | — | — | — | — | 2.5 | — | — | — |
| Trimethyl soya ammon-ium neodecanoate | — | — | — | — | 2.5 | — | — | — | — | — | — | — | — | — |
| Benzyl trimethyl ammonium sodium hydrophosphate | — | — | — | 1.5 | — | — | — | — | — | — | — | — | — | — |
| Molecular sieves | — | — | — | — | — | — | 3.0 | — | — | — | — | — | — | — |
| Sodium stearate | — | — | — | — | — | — | — | 2.5 | — | — | — | — | — | — |
| Potassium stearate | — | — | — | — | — | — | — | — | 2.5 | — | — | — | — | — |
| Potassium 3-(3,5-di-t-butyl-4-hydroxy-phenyl)propionate | — | 2 | — | — | — | — | — | — | — | — | — | 2.0 | — | — |
| Bis(benzyl trimethyl ammonium trimethyl adipate | — | — | — | — | — | 2.5 | 2.5 | 3.0 | 3.0 | — | — | — | — | — |
| Press Cure at 320°F. |  |  |  |  |  |  |  |  |  |  |  |  |  |  |
| Minutes | 20 | 20 | 12 | 15 | 8 | 20 | 20 | 13 | 17 | 30 | 20 | 15 | 20 | 30 |
| Tensile, psi | 1400 | 1920 | 1890 | 1750 | 1820 | 950 | 1250 | 1940 | 1950 | 950 | 1750 | 1910 | 1320 | 1420 |
| Elongation, % | 740 | 800 | 900 | 930 | 860 | 930 | 810 | 840 | 820 | 710 | 1050 | 820 | 890 | 800 |
| Hardness, Duro. A | 49 | 52 | 50 | 50 | 50 | 44 | 46 | 50 | 50 | 52 | 51 | 51 | 51 | 50 |
| Compression set, % (22 hrs. at 212°F.) | 15 | 9 | 14 | 19 | 17 | 33 | 34 | 14 | 13 | — | — | — | — | — |

All of the compositions are within the scope of the present invention. Samples 1 to 5 employed a cure system consisting essentially of an alkali metal salt of a dicarboxylic acid and a quaternary ammonium salt. Sample 2 contains, besides the two ingredients, an additional halide ion acceptor. Samples 6 to 9 employ as the basic cure system ingredient, a bis(quaternary ammonium salt) of a dicarboxylic acid. The data shows (samples 6 versus samples 7 to 9) that the use of some additional halide ion acceptor improves the cure in these instances. Samples 10 to 14 demonstrate the use of salts of various dicarboxylic acids in the cure system.

EXAMPLE V

Various other halogen-bearing elastomerric polymers were cured using the cure system of this invention. A polychloroprene rubber having a ML-2.5 at 212°F. Mooney value of about 48, and a brominated butyl rubber having about 2.1% by weight of bromine, were employed. Additionally, samples of chlorosulfonated polyethylene (Hypalon 20 and Hypalon 45) were cured using dipotassium azelate and trimethyl soya ammonium chloride as the curing agents. Tensile sheets were not prepared on these samples. The cure recipes and data are as follows:

|  | 1 | 2 | 3 | 4 | 5 | 6 |
|---|---|---|---|---|---|---|
| Polychloroprene | 100 | 100 | 100 | — | — | — |
| Brominated butyl | — | — | — | 100 | 100 | 100 |
| N550 Black | 40 | — | — | 40 | 40 | — |
| N330 Black | — | 40 | 40 | — | — | 45 |
| TE-80 | — | 1 | 1 | 1 | 1 | 2 |
| Adipic Acid | 1.8 | — | — | — | — | — |
| Disodium trimethyl adipate | — | — | — | — | — | 1.0 |
| Dipotassium dodecenyl succinate | — | 1.5 | 1.5 | 1.5 | 1.5 | — |
| Bis(trimethylamine) sebacimide | — | 1.0 | — | 1.0 | — | — |
| Trimethyl soya ammonium chloride | 0.5 | — | 1.0 | — | 1.0 | — |
| Dodecyl pyridinium bromide | — | — | — | — | — | 1.0 |
| Potassium stearate | 3.0 | — | — | — | — | — |
| Press Cure |  |  |  |  |  |  |
| Time, minutes | 20 | 40 | 40 | 40 | 40 | 60 |
| Temperature, °F. | 338 | 320 | 320 | 320 | 320 | 320 |
| Tensile, psi | 2380 | 2620 | 2900 | 1780 | 1350 | 1360 |
| Elongation, percent | 330 | 260 | 290 | 290 | 500 | 390 |

| Ingredient | Parts | Ingredient | Parts | Ingredient | Parts | Gel Time (minutes) |
|---|---|---|---|---|---|---|
| 1 Trimethyl adipic acid | 5.0 | N-methyl piperidine | 6.0 | Molecular sieves | 3.0 | 150 |
| 2 Trimethyl adipic acid | 5.0 | N-methyl piperidine | 6.0 | Molecular sieves | 6.0 | 62 |
| 3 Trimethyl adipic acid | 5.0 | N-methyl piperidine | 6.0 | Molecular sieves | 9.0 | 13 |
| 4 Trimethyl adipic acid | 5.0 | Benzyl trimethyl ammonium hydroxide | 6.0 | Molecular sieves | 6.0 | 66 |
| 5 Trimethyl adipic acid | 5.0 | Benzyl trimethyl ammonium hydroxide | 10.0 | Molecular sieves | 9.0 | 9 |
| 6 Trimethyl adipic acid | 5.0 | Benzyl trimethyl ammonium hydroxide | 10.0 | $Na_3PO_4$ | 10.0 | 9 |
| 7 Disodium azelate | 7.0 | Trimethylamine/hydrochloric acid adduct | 0.5 | Sodium stearate | 2.0 | 19 |
| 8 Disodium azelate | 5.0 | Bis(trimethyl amine) sebacimide | 1.0 | — | | 57 |
| 9 Disodium azelate | 7.0 | Bis(trimethylamine) sebacimide | 1.0 | — | | 43 |
| 10 Dipotassium azelate | 7.0 | Trimethyl soya ammonium chloride | 0.5 | — | | 80 |
| 11 Dipotassium trimethyl adipate | 7.0 | Trimethyl soya ammonium chloride | 0.5 | — | | 62[a] |
| 12 Disodium trimethyl adipate | 6.8 | Dodecyl pyridinium bromide | 0.5 | — | | 17 |
| 13 Dipotassium dodecenyl succinate | 8.5 | Dodecyl pyridinium bromide | 0.5 | — | | 38 |
| 14 Dipotassium-1,4-cyclohexane dicarboxylate | 7.0 | Trimethyl soya ammonium chloride | 1.0 | — | | 55 |
| 15 Bis(benzyl trimethyl ammonium)adipate | 6.0 | — | | — | | 31 |
| 16 Bis(benzyl trimethyl ammonium)azelate | 6.0 | — | | — | | 10 |
| 17 Bis(benzyl trimethyl ammonium)-1,4-cyclohexane dicarboxylate | 6.0 | — | | — | | 33 |

[a] at 165°C.

| | 1 | 2 | 3 | 4 | 5 | 6 |
|---|---|---|---|---|---|---|
| Hardness, Duro. A | 60 | 68 | 66 | 59 | 55 | 68 |

EXAMPLE VI

To aid in evaluating a broad range of cure system ingredients, a screening procedure was developed. The procedure uses a liquid halogen-bearing polymer which has all of the features of the solid polymers, i.e., the same halogen-bearing monomers and similar copolymerizable vinylidene monomers. The low molecular weight liquid polymer can be prepared using standard polymerization recipes but employing high levels of a chain modifier.

The screening procedure comprises mixing the liquid halogen-bearing polymer with a di- or polycarboxylic acid, a monofunctional secondary or tertiary amine or a quaternary ammonium salt, and a halide ion acceptor (or a combined form of these ingredients), placing the mixture into a large test tube, placing the filled test tube into a 150°C. oil bath, putting a stainless steel spatula into the mixture in the test tube, said spatula being turned in place, and measuring in minutes the time until the mixture gels. A shorter gel time indicates faster cure. Good correlation between cure of the liquid polymer in the screening procedure and cure of a solid polymer in a press-cure is obtained.

The liquid polymer used for the screening procedure consists of interpolymerized units of 45.5% by weight of n-butyl acrylate, 45.5% by weight of ethyl acrylate, and 9% by weight of vinyl benzyl chloride. The polymer viscosity (bulk viscosity) is 1,830,000 centipoises measured at 23°C. using a Brookfield LVT Viscometer at 0.3 rpm with Spindle No. 4. The results of the tests are given in the following table. Cure system ingredients are given in parts by weight per 100 parts by weight of polymer.

I claim:

1. A vulcaniza composition comprising (1) a halogen-bearing elastomeric polymer, and (2) a cure system consisting essentially of (a) a di- or polyfunctional carboxylic acid having 6 to about 40 carbon atoms in the molecule, (b) quaternary ammonium salt or a monofunctional secondary or tertiary amine, and (c) a halide ion acceptor selected from the group consisting of (I) alkali and non-alkali metal salts of monocarboxylic acids containing 2 to about 24 carbon atoms, (II) metal salts of organo-phosphoric acids of the structure $$(RO)_{\overline{y}}PO_yOM$$

wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or an alkyl phenoxy poly(ethyleneoxy)ethyl group, (III) a non-alkali metal oxy compound selected from the group consisting of oxides, hydroxides, and carbonates of barium, lead, calcium, magnesium, zinc, copper, aluminum, or cadmium, (IV) an alkali or alkaline earth metal hydroxides, alkoxide, carbonate, borate, silicate, or phosphate, and (V) untreated molecular sieves; (a) used at from about 0.1 part to about 10 parts by weight, (b) used at from about 0.1 part to about 10 parts by weight, and (c) used at from about 0.1 part to about 15 parts by weight, all based on 100 parts by weight of the halogen-bearing elastomer.

2. A composition of claim 1 wherein (a) is an aliphatic or alicyclic dicarboxylic acid containing from 6 to 40 carbon atoms in the molecule.

3. A composition of claim 2 wherein (b) is a monofunctional tertiary amine added in the form of an amine/acid adduct or an amine percursor.

4. A composition of claim 2 wherein (b) is a monofunctional secondary amine added in the form of an amine/acid adduct or an amine/isocyanate reaction product.

5. A composition of claim 2 wherein (1) is selected from the group consisting of halogen-bearing acrylate rubbers, polyepihalohydrin elastomers, chloroprene rubbers, brominated butyl rubbers,, brominated EPDM rubbers, and chlorosulfonated polyethylene polymers.

6. A composition of claim 5 wherein (a) is an aliphatic dicarboxylic acid.

7. A composition of claim 6 wherein the halogen-bearing elastomeric polymer is a chloroprene rubber and the cure system consists of (a) adipic acid, (b) trimethyl soya ammonium chloride, and (c) potassium stearate.

8. A composition of claim 6 wherein the halogen-bearing elastomeric polymer is a halogen-bearing acrylate rubber of interpolymerized units of (1) an acrylate(s) of the formula

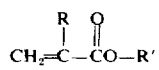

wherein R is hydrogen, methyl or ethyl, and R' is selected from the group consisting of an alkyl radical containing 1 to about 24 carbon atoms, an alkoxyalkyl radical containing a total of 2 to about 12 carbon atoms in the radical, and an alkylthioalkyl radical containing a total of 2 to about 12 carbon atoms in the radical, and (2) a halogen-bearing vinylidene monomer selected from the group consisting of vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

9. A composition of claim 8 wherein the acrylate polymer consists of interpolymerized units of ehtyl acrylate, n-butyl acrylate, and vinyl benzyl chloride, and the cure system consists of (a) trimethyl adipic acid, (b) n-methyl piperidine, and (c) untreated molecular sieves.

10. A composition of claim 8 where in (b) the quaternary ammonium salt has the formula

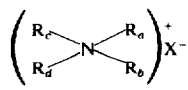

wherein $R_a$, $R_b$, $R_c$ and $R_d$ are alkyl, aryl, alkaryl, or aralkyl radicals containing 1 to about 18 carbon atoms, or wherein two or three of the $R_a$, $R_b$, $R_c$, $R_d$ radicals form with the nitrogen atom a heterocyclic structure containing 3 to 8 atoms selected from the group consisting of C, N, O and S where at least two atoms are C; and X is an anion from an inorganic or organic acid wherein the acidic hydrogen is attached to halogen or oxygen.

11. A composition of claim 10 wherein (b) is a quaternary ammonium salt wherein X is selected from the group consisting of $Cl^-$, $Br^-$, $I^-$, $OH^-$, $NO_3^-$, $HSO_4^-$, $NaSO_4^-$, $H_2PO_4^-$, $NaHPO_4^-$, $ROPO_3H^-$, $RCOO^-$, $ROSO_3^-$, $RSO_3^-$, and $H_2BO_3^-$, where R is an aliphatic, alkyl or alkaryl radical containing 1 to 18 carbon atoms.

12. A composition of claim 11 wherein the acrylate polymer consists of interpolymerized units of ethyl acrylate, n-butyl acrylate, and vinyl benzyl chloride, and the cure system consists of (a) trimethyl adipic acid, (b) benzyl trimethyl ammonium hydroxide, and (c) untreated molecular sieves or $Na_3PO_4$.

13. A composition of claim 11 wherein (c) is a non-alkali metal oxide, hydroxide, or carbonate wherein the non-alkali metal is selected from the group consisting of barium, lead, calcium, magnesium, copper and cadmium.

14. A vulcanizable composition comprising (1) a halogen-bearing elastomeric polymer, and (2) a cure system consisting essentially of (i) a monofunctional secondary or tertiary amine salt of a di- or polycarboxylic acid containing 6 to about 40 carbon atoms in the carboxylic acid, and (ii) a halide ion acceptor selected from the group consisting of (I) alkali and non-alkali metal salts of monocarboxylic acids containing 2 to about 24 carbon atoms, (II) metal salts of organo-phosphoric acids of the structure

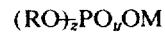

wherein M is an alkali metal, $y = 1$ or 2, $z = 1$ or 2, and $y + z = 3$, and R is an alkyl radical containing 1 to 24 carbon atoms, an aryl radical coontaining 6 to 24 carbon atoms, or an alkyl phenoxy poly(ethyleneoxy)ethyl group, (III) a non-alkali metal oxy compound selected from the group consisting of oxides, hydroxides, and carbonates of barium, lead, calcium, magnesium, zinc, copper, aluminum, or cadmium, (IV) an alkali or alkaline earth metal hydroxides, alkoxide, carbonate, borate, silicate, or phosphate, and (V) untreated molecular sieves, where (i) is used at from about 0.1 part of about 20 parts by weight, and (ii) is used at from about 0.1 part to about 15 parts by weight, both based on 100 parts by weight of the halogen-bearing elastomeric polymer.

15. A vulcanizable composition comprising a halogen-bearing elastomeric polymer, and (2) a cure system consisting essentially of (i) a metal salt of a di- or polycarboxylic acid containing 6 to about 40 carbon atoms in the carboxylic acid wherein the metal is selected from the group consisting of sodium, potassium, lithium, barium, calcium, magnesium, lead, copper zinc, aluminum, and cadmium, and (ii) a quaternary ammonium salt or a monofunctional secondary or tertiary amine, where (i) is used at from about 0.1 part to about 20 parts by weight, and (ii) used at from about 0.1 part to about 10 parts by weight, both based upon 100 parts by weight of the halogen-bearing elastomeric polymer.

16. A composition of claim 15 wherein the halogen-bearing elastomeric polymer is selected from the group consisting of halogen-bearing acrylate rubbers, polyepihalohydrin elastomers, chloroprene rubbers, and brominated butyl rubbers.

17. A composition of claim 16 where in the cure system in ingredient (i) the metal is sodium or potassium and the dicarboxylic acid is selected from the group consisting of adipic acid, trimethyl adipic acid, azelaic acid, dodecyl succinic acid, 1,4-cyclohexane dicarboxylic acid, and dimer acid.

18. A composition of claim 17 wherein (ii) is a monofunctional tertiary or secondary amine.

19. A composition of claim 18 wherein (i) the metal salt of dicarboxylic acid is selected from the group consisting of disodium azelate, dipotassium azelate, disodium trimethyl adipate, dipotassium dodecenyl succinate, and dipotassium trimethyl adipate, and (ii) the amine is selected from the group consisting of n-methyl piperidine, trimethyl amine/hydrochloric acid adduct, and bis(trimethyl amine)sebacimide.

20. A composition of claim 19 wherein the halogen-bearing elastomeric polymer is a halogen-bearing acrylate rubber of interpolymerized units of (1) an acrylate(s) of the formula

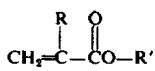

wherein R is hydrogen, methyl or ethyl, and R' is selected from the group consisting of an alkyl radical containing 1 to about 24 carbon atoms, an alkoxy alkyl radical containing a total of 2 to about 12 carbon atoms in the radical, and an alkylthioalkyl radical containing a total of 2 to about 12 carbon atoms in the radical, and (2) a halogen-bearing vinylidene monomer selected from the group consisting of vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

21. A composition of claim 19 wherein the halogen-bearing elastomeric polymer is a chloroprene rubber and the cure system consists of (i) dipotassium dodecenyl succinate, and (II) bis(trimethyl amine)sebacimide.

22. A composition of claim 19 wherein the halogen-bearing elastomeric polymer is a brominated butyl rubber and the cure system consists of (i) dipotassium dodecenyl succinate and (ii) bis(trimethyl amine)sebacimide.

23. A composition of claim 17 wherein (ii) is a quaternary ammonium salt of the formula

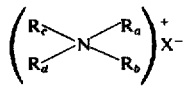

wherein $R_a$, $R_b$, $R_c$ and $R_d$ are alkyl, aryl, alkaryl, or aralkyl radicals containing 1 to about 18 carbon atoms, or wherein two or three of the $R_a$, $R_b$, $R_c$ or $R_d$ radicals form with the nitrogen atom a heterocyclic structure containing 3 to 8 atoms selected from the group consisting of C, N, O and S where at least two atoms are C; where X is selected from the group consisting of $Cl^-$, $Br^-$, $I^-$, $OH^-$, $NO_3^-$, $HSO_4^-$, $NaSO_4^-$, $H_2PO_4^-$, $NaHPO_4^-$, $ROPO_3H^-$, $RCOO^-$, $ROSO_3^-$, $RSO_3^-$, and $H_2BO_3^-$, where R is an aliphatic, alkyl or alkaryl radical containing 1 to 18 carbon atoms.

24. A composition of claim 23 wherein the halogen-bearing elastomeric polymer is a polyepihalohydrin polymer and the cure system consists of (i) a metal salt of a dicarboxylic acid selected from the group consisting of disodium trimethyl adipate, dipotassium trimethyl adipate, dipotassium azelate, dipotassium dodecyl succinate, and dipotassium dimer acid, and (ii) a quaternary ammonium salt selected from the group consisting of trimethyl soya ammonium chloride, dodecyl pyridinium bromide, benzyl trimethyl ammonium sodium hydrophosphite and trimethyl soya ammonium neodecanoate.

25. A composition of claim 23 wherein the halogen-bearing elastomeric polymer is chloroprene rubber and the cure system consists of (i) dipotassium dodecyl succinate and (ii) trimethyl soya ammonium chloride.

26. A composition of claim 23 wherein the halogen-bearing elastomeric polymer is a brominated butyl rubber and the cure system consists of (i) a metal salt of a dicarboxylic acid selected from the group consisting of disodium trimethyl adipate, and dipotassium dodecyl succinate, and (ii) a quaternary ammonium salt selected from the group consisting of trimethyl soya ammonium chloride and dodecylpyridinium bromide.

27. A composition of claim 23 wherein the halogen-bearing elastomeric polymer is a halogen-bearing acrylate rubber of interpolymerized units of (1) an acrylate(s) of the formula

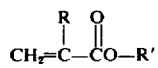

wherein R is hydrogen, methyl or ethyl, and R' is selected from the group consisting of an alkyl radical containing 1 to about 24 carbon atoms, an alkoxy alkyl radical containing a total of 2 to about 12 carbon atoms in the radical, and an alkyl thioalkyl radical containing a total of 2 to about 12 carbon atoms in the radical, and (2) a halogen bearing vinylidene monomer selected from the group consisting of vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

28. A composition of claim 27 wherein the acrylate rubber consists of interpolymerized units of (1) ethyl acrylate, n-butyl acrylate, methoxyethyl acrylate, or mixtures thereof with (2) vinyl benzyl chloride, vinyl chloroacetate or 5-chloroacetoxymethyl-2-norbornene.

29. A composition of claim 28 wherein the cure system consists of (i) dipotassium azelate, and (ii) trimethyl soya ammonium chloride.

30. A composition of claim 28 wherein the cure system consists of (i) disodium azelate, and (ii) trimethyl soya ammonium chloride.

31. A composition of claim 28 wherein the cure system consists of (i) disodium or dipotassium trimethyl adipate and (ii) a quaternary ammonium salt selected from the group consisting of tetraethyl ammonium p-toluene sulfonate, trimethyl soya ammonium chloride, benzyl trimethyl ammonium dodecyl benzene sulfonate, benzyl trimethyl ammonium, and sodium hydrogen phosphate, benzyl trimethyl ammonium hydroborate.

32. A composition of claim 28 wherein the cure system consists of (i) dipotassium dodecyl succinate, and (ii) quaternary ammonium salt selected from the group consisting of trimethyl soya ammonium chloride and dodecylpyridinium bromide.

33. A composition of claim 28 wherein the cure system consists of (i) a metal salt of a dicarboxylic acid selected from the group consisting of dipotassium-1,4-cyclohexane dicarboxylate, disodium dimer acid, and dipotassium dimer acid, and (ii) trimethyl soya ammonium chloride.

34. A vulcanizable composition comprising (1) 100 parts by weight of a halogen-bearing elastomeric polymer, and (2) a cure system consisting essentially of (i) from about 0.1 part to about 20 parts by weight based on the weight of the polymer of a quaternary ammonium salt of a di- or polycarboxylic acid containing 6 to about 40 carbon atoms in the carboxylic acid, and (ii)

up to 15 parts by weight of a halide ion acceptor selected from the group consisting of (I) alkali and non-alkali metal salts of monocarboxylic acids containing 2 to about 24 carbon atoms, (II) metal salts of organo-phosphoric acids of the structure $(RO)_zPO_yOM$ wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or an alkyl phenoxy poly(ethyleneoxy)ethyl group, (III) a non-alkali metal oxy compound selected from the group consisting of oxides, hydroxides, and carbonates of barium, lead, calcium, magnesium, zinc, copper, aluminum, or cadmium, (IV) an alkali or alkaline earth metal hydroxide, alkoxide, carbonate, borate, silicate or phosphate, and (V) untreated molecular sieves.

35. A composition of claim 34 wherein the quaternary ammonium salt cation has the structure $(R_aR_bR_cR_dN)^+$ where $R_a$, $R_b$, $R_c$ and $R_d$ are selected from the group consisting of alkyl, aryl, alkaryl and aralkyl radicals containing 1 to about 18 carbon atoms, or where two or three of the $R_a$, $R_b$, $R_c$, and $R_d$ radicals form with the nitrogen atom a heterocyclic structure containing 3 to 8 atoms selected from the group consisting of C, N, O and S, where at least two atoms are C.

36. A composition of claim 35 wherein the halogen-bearing elastomeric polymer is a polyepichlorohydrin polymer and the cure system consists of (i) bis(benzyl trimethyl ammonium)trimethyl adipate and (ii) the halide ion acceptor is sodium stearate, potassium stearate or untreated molecular sieves.

37. A composition of claim 35 wherein the halogen-bearing elastomeric polymer is a halogen-bearing acrylate rubber of interpolymerized units of (1) an acrylate(s) of the formula

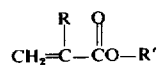

wherein R is hydrogen, methyl or ethyl, and R' is selected from the group consisting of an alkyl radical containing 1 to about 24 carbon atoms, an alkoxy alkyl radical containing a total of 2 to about 12 carbon atoms in the radical, and an alkylthioalkyl radical containing a total of 2 to about 12 carbon atoms in the radical, and (2) a halogen-bearing vinylidene monomer selected from the group consisting of vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

38. A composition of claim 37 wherein the cure system consists of quaternary ammonium salts of a dicarboxylic acid selected from the group consisting of bis(tetraethyl ammonium)cyclohexane-1,4-dicarboxylate, bis(benzyl trimethyl ammonium)azelate, bis(benzyl trimethyl ammonium) trimethyl adipate, and bis(benzyl trimethyl ammonium)cyclohexane-1,4-dicarboxylate.

39. A vulcanizable composition comprising (1) a halogen-bearing elastomeric polymer, and (2) a cure system consisting essentially of (i) a mixed salt of a di- or polycarboxylic acid containing 6 to about 40 carbon atoms in the carboxylic acid wherein the cation portion is selected from the group consisting of quaternary ammonium salt cations, monofunctional tertiary amine cations, monofunctional secondary amine cations, and alkali and non-alkali metal cations, and (ii) a halide ion acceptor selected from the group consisting of (I) alkali and non-alkali metal salts of monocarboxylic acids containing 2 to about 24 carbon atoms, (II) metal salts of organo-phosphoric acids of the structure $(RO)_zPO_yOM$ wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or an alkyl phenoxy poly(ethyleneoxy)ethyl group, (III) a non-alkali metal oxy compound selected from the group consisting of oxides, hydroxides, and carbonates of barium, lead, calcium, magnesium, zinc, copper, aluminum, or cadmium, (IV) an alkali or alkaline earth metal hydroxides, alkoxide, carbonate, borate, silicate, or phosphate, and (V) untreated molecular sieves, where (i) is used at from about 0.1 part to about 20 parts by weight, and (ii) is used at from about 0.5 part to about 15 parts by weight, both based upon 100 parts by weight of the halogen-bearing elastomeric polymer.

40. A composition of claim 39 wherein the halogen-bearing elastomeric polymer is a halogen-bearing acrylate rubber of interpolymerized units of (1) an acrylate(s) of the formula

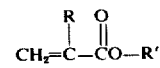

wherein R is hydrogen, methyl or ethyl, and R' is selected from the group consisting of an alkyl radical containing 1 to about 24 carbon atoms, and alkoxy alkyl radical containing a total of 2 to about 12 carbon atoms in the radical, and an alkylthioalkyl radical containing a total of 2 to about 12 carbon atoms in the radical, and (2) a halogen-bearing vinylidene monomer selected from the group consisting of vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

41. A composition of claim 40 wherein the cure system consists of 1-sodium-4-(trimethyl cetyl ammonium)-cyclohexane dicarboxylate.

* * * * *